(12) United States Patent
Dragone (10) Patent No.: US 6,574,396 B1
(45) Date of Patent: Jun. 3, 2003

(54) WAVEGUIDE GRATING ARRANGEMENT USING A SEGMENTED REFLECTOR

(75) Inventor: Corrado P. Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 125 days.

(21) Appl. No.: 09/805,609

(22) Filed: Mar. 12, 2001

(51) Int. Cl.[7] .............................. G02B 6/34; G02B 6/293
(52) U.S. Cl. ............................................. 385/37; 385/24
(58) Field of Search .............................. 385/37, 14, 24, 385/46, 47

(56) References Cited

U.S. PATENT DOCUMENTS

| | | | | |
|---|---|---|---|---|
| 5,371,813 A | * | 12/1994 | Artigue | 385/24 |
| 5,450,511 A | * | 9/1995 | Dragone | 385/37 |
| 5,680,490 A | * | 10/1997 | Cohen et al. | 385/24 |
| 6,028,706 A | * | 2/2000 | Shirasaki et al. | 359/577 |
| 6,049,640 A | * | 4/2000 | Doerr | 385/15 |
| 6,122,419 A | * | 9/2000 | Kurokawa et al. | 385/31 |
| 6,141,152 A | * | 10/2000 | Trouchet | 359/634 |

OTHER PUBLICATIONS

Huang et al. Arrayed waveguide grating DWDM interleaver. Optical Fiber Communication Conference and Exhibit, 2001 (OFC 2001), vol. 3, pp. WDD80-1 –WDD80-3. Mar. 2001.*

* cited by examiner

Primary Examiner—Rodney Bovernick
Assistant Examiner—Mike Stahl
(74) Attorney, Agent, or Firm—John A. Caccuro (57) ABSTRACT

A wavelength slicer uses a waveguide grating router having a periodic arrangement of reflectors in the output circular boundary of the router, which causes each input signal to pass twice through the router. The slicer includes two interleaved sets of equally spaced reflectors. Each set is slightly displaced from the output curve, and their displacements are properly chosen so as to effectively produce a phase shift of $\pi/2$ between the reflected signals. The reflected signals again pass through the router to produce two separate signals, containing respectively the even and odd channels of the input signal. A second slicer embodiment is realized using two gratings that are coupled to elliptical and circular reflectors. A wavelength filter is realized by forming on the output curve a set of equally spaced reflectors with spacing equal to an integer fraction of the spacing of the images.

23 Claims, 11 Drawing Sheets

WAVEGUIDE GRATING ARRANGEMENT USING A SEGMENTED REFLECTOR

TECHNICAL FIELD OF THE INVENTION

This invention relates to wavelength-division multiplexing in optical systems, and more particularly to apparatus for combining and/or separating combs of equally spaced wavelength channels.

BACKGROUND OF THE INVENTION

An important function that must be provided in high quality optical networks is that of wavelength multiplexing and demultiplexing a plurality of signals of different wavelengths. In particular, an important device for performing this function is the interleaver (also referred to herein as a slicer) which separates an input signal consisting of closely spaced wavelength signals, into two sets of equally spaced wavelength channels, each set having twice the spacing of the interleaved signal. The interleaver must have low loss, preferably less than 3 dB, and it must be approximately characterized by rectangular transfer functions.

A technique that is often used for combining and separating signals of various channels in wavelength-division multiplexing is the wavelength router. A rectangular transfer function can be realized by concatenating two such routers, but such an arrangement is difficult to realize on a single wafer using conventional techniques for two reasons. The first reason is that the loss of a conventional router typically exceeds 3 dB, which would result in two concatenated routers having a total loss of more than 6 dB. Another reason is that the two-router arrangement is difficult to realize on a planar wafer because of the size of the two routers, particularly when the channel spacing is equal to the free-spectral range of the routers, in which case one finds that the layout of the two routers typically overlap.

Thus there is a continuing need for a low loss interleaver or slicer having rectangular wavelength transfer functions.

SUMMARY OF THE INVENTION

In one embodiment of my new invention, a low loss wavelength slicer is implemented using a waveguide grating router connected to an input 2×2 coupler. The router is terminated by an output reflective arrangement causing each reflected signal to pass twice through the router. The reflective arrangement consists of two interleaved sets of reflective elements located in the immediate vicinity of the output image curve of the router. Each set is slightly displaced from the output curve, and their displacements are properly chosen so as to effectively produce a phase shift of $\pi/2$ between the signals reflected by the two sets. The reflected signals then pass again through the router and the 2×2 coupler which produces two separate output signals, containing respectively the even and odd channels of the input signal, which are each outputted from separate input ports of the 2×2 coupler. In another embodiment, a wavelength filter is realized by forming on the output curve a set of equally spaced reflectors with spacing equal to an integer fraction of the spacing of the images. A second slicer embodiment is realized by using two routers or gratings that are coupled to elliptical and circular reflectors that separate the even and odd channels.

More generally my invention is directed to an optical imaging apparatus comprising a grating having an input curve and an output image curve produced with specified magnification M, the optical imaging apparatus further comprising (1) an input waveguide connected to a location P of the input curve for receiving an input signal at a particular input wavelength, the input signal being dispersed by the various orders of the grating into a set of equally spaced images produced on the output image curve with spacing $\Omega$, the dispersion by the grating causing the locations of the output images on the output image curve to vary with wavelength and (2) a periodic arrangement A of reflective elements located along the output image curve with period essentially equal to an integer fraction of the spacing $\Omega$ of the output images, where the integer can be equal to unity, each reflective element essentially reversing (reflecting over the same path) the propagation direction of an image intercepted by that element, the periodic arrangement thereby causing the set of equally spaced images to produce reflected signals which pass back through the grating to the input waveguide, the power reflected signals are efficiently transferred back to the input waveguide, thereby causing an output signal traveling in the input waveguide in a direction opposite that of the input signal.

In a second arrangement, a second input waveguide is connected to a location Q of the input curve, so as to realize two separate input ports with locations P and Q separated by a specified lateral displacement d, the periodic arrangement of reflective elements A is interleaved with a second periodic arrangement of reflective elements B, so that each element A is adjacent to an element B, and the spacing of the two elements is approximately equal to the image Md of the input displacement d, the two elements A and B being characterized by reflections of similar magnitudes but different phases that approximately differ by $\pi/2$.

In another embodiment, the displacement d is chosen so that its image Md on the output curve is approximately equal to half the spacing $\Omega$ of the output images, and the grating is arranged to have a suitable periodic path length variation in adjacent arms so as to cause $\pm\pi/4$ opposite phase shift in adjacent arms, wherein a particular input signal of a particular wavelength is split into two interleaved output image sets displaced by $\Omega/2$. The optical apparatus thereby forms a reflective imaging arrangement with two input waveguides characterized by four reflection coefficients, each reflection coefficient produced in a particular input waveguide by a signal applied to one of the two input waveguides, such that the wavelength response produced by each of the four reflection coefficients is characterized by two sets of interleaved wavelength intervals U and V, with one set representing passbands of efficient reflection, and the other set representing stopbands of substantially lower reflection.

In yet another embodiment, instead of including the above path length variation, a 2×2 coupler is added to the optical apparatus thereby forming a reflective arrangement which is characterized by four reflection coefficients, each reflection coefficient produced in a particular input waveguide by a signal applied to one of the two input waveguides. The reflective arrangement, in response to a multiple wavelength input signal applied to the first input port, produces a reflected signal back to the first input port which has a wavelength response characterized by two sets of interleaved wavelengths U and V, with one set U representing passbands of efficient reflection back to the first input port, and the other set V representing stopbands of substantially lower reflection back to the first input port.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is first located in FIG. 1).

DETAILED DESCRIPTION

A. Router Description

Figure 1:
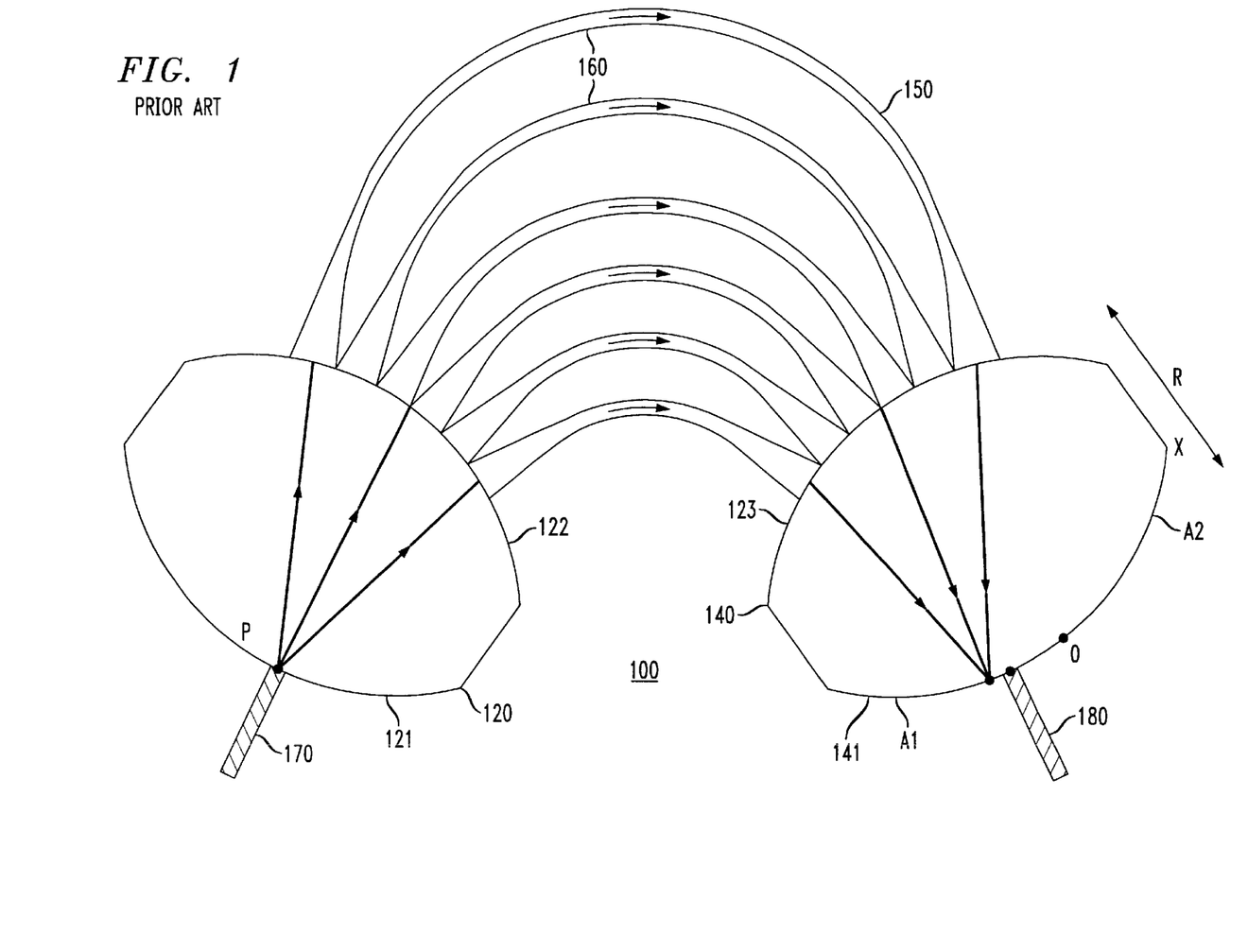
FIG. 1 illustrates the basic prior art form of optical wavelength router or grating.

FIG. 1 shows the basic structure of a prior art imaging arrangement 100 of the form used in the invention. Note the imaging arrangement will also be referred to herein as a router. The imaging arrangement 100 is described in U. S. Pat. No. 6,023,544, issued on Feb. 8, 2000, which is incorporated by reference herein. The imaging arrangement 100 includes an input section 120 and an output section 140 spaced apart and interconnected by a grating 150 including an appropriate plurality of optical waveguide arms 160. The input and output sections typically are each free-space slabs, such as star couplers, that have the property that wave energy applied by an input waveguide 170 acting as a point source P forms a plurality of output images, of which three are shown as $P_{i-1}$, $P_i$, and $P_{i+1}$ in FIG. 2. The optical waveguide arms 160 typically are thin narrow layers of silica supported on a planar silicon wafer, as known in the art.

In a conventional imaging arrangement or router, the input and output ports are connected to the input and output sections 120 and 140 along portions of two circles that are typically referred to as the input 121 and output 141 circles. Here I simply refer to them as the input and output curves. For simplicity, FIG. 1 shows only one input 170 and one output 180 port.

The result is a router that produces a wavelength dependent output image of each input signal. The location of each output image is determined by its wavelength λ and therefore, signals of different wavelengths from a particular input port give rise to separate images that can be received by different output ports. Typically optical fibers are used for applying input signals to the input ports and for extracting output signals from the output ports. In practice, several output ports will be needed, if the router is to send signals to different destinations. Similarly, several input ports will be needed, in order to receive signals from different inputs. In wavelength division optical networks, the different wavelengths would represent different communication channels.

Figure 2:
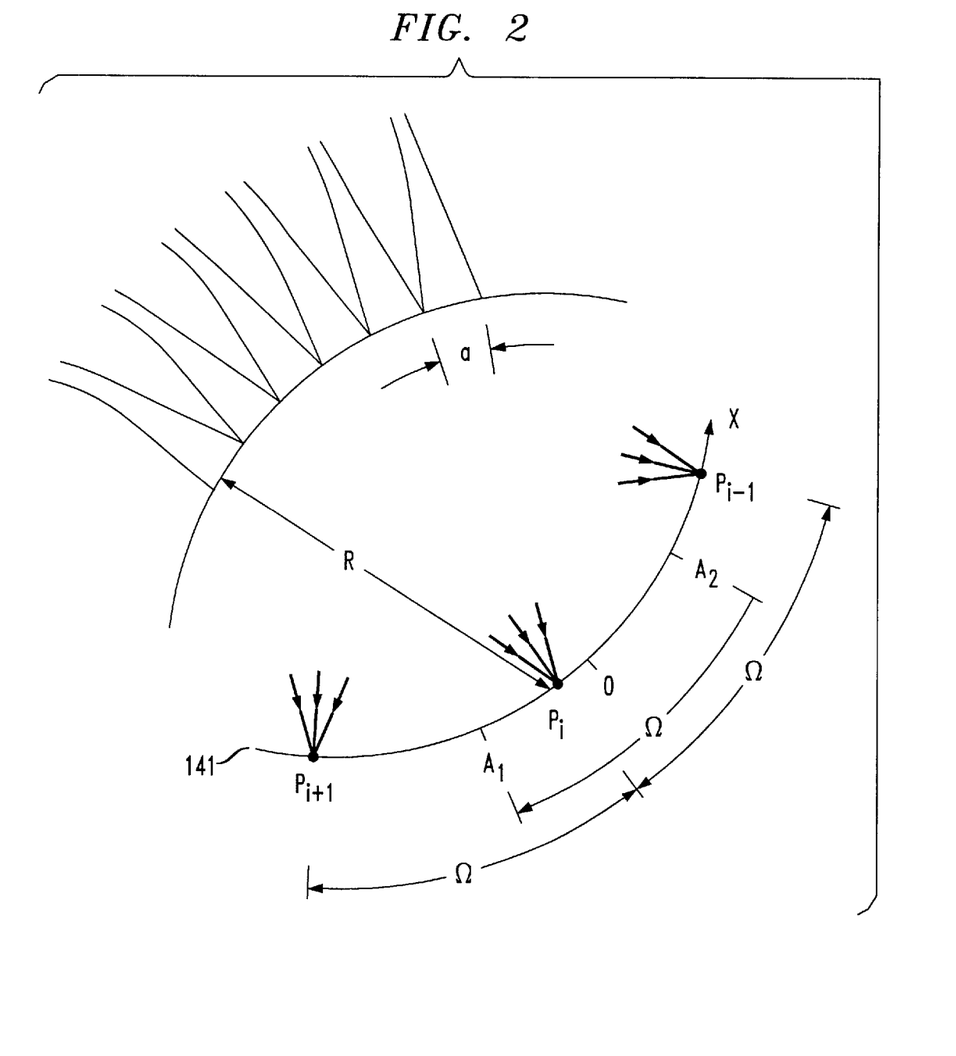
FIG. 2 shows the output slab of the wavelength router shown in FIG. 1.

In FIG. 1, the input signal radiated from the input waveguide 170 at a particular wavelength is radiated from the waveguide location towards the receiving apertures of the arms 160 forming the grating 150. As discussed earlier, there would be an appropriate number of arms in the grating 150. Each arm receives a component of the input signal. The signal is therefore split into many components, each traveling along a particular arm. Each arm applies to its component an appropriate phase shift, proportional to the optical path length of the arm. In a conventional router, successive arms are characterized to a good approximation by a constant path length difference. Then, one finds that the various signal components of a signal from an input port, radiated by the arms towards the output curve, all add in phase at certain locations on the output curve 141 shown in FIG. 2. As a result, several images $P_{i-1}$, $P_i$, $P_{i+1}$ of the input signal are produced on the output curve 141. These images represent different orders of the grating. They are equally spaced, and they have different intensities. Their spacing Ω is determined by the spacing a of the arms radiating apertures, $$\Omega = \frac{R\lambda}{a}$$

where R is the distance of the radiating apertures from the arms' focal point O and λ/a is the angular spacing corresponding to Ω. The spacing Ω is a function of the wavelength. However this dependence can be typically ignored, provided that λ is close to a particular design wavelength $\lambda_0$, in which case Ω can be considered to be approximately equal to the value $\Omega_0$ at this particular wavelength $\lambda_0$. In the following I ignore for simplicity the above wavelength dependence. On the other hand, the phase shifts produced by the various arms typically have strong wavelength dependence. By varying the wavelength, the locations of the output images $P_{i-1}$, $P_i$, $P_{i+1}$ will vary along the output curve 141. Of greatest importance in a conventional router is the central image of highest intensity. This is the image closest to the central point O corresponding to the focal point of the arms. This image is produced inside the central zone, which is an interval of width Ω centered at O. The remaining images (higher orders) are produced in adjacent zones, of the same width. They typically have appreciably smaller intensity in all cases except when they are close to the boundaries of the central zone.

Figure 3:
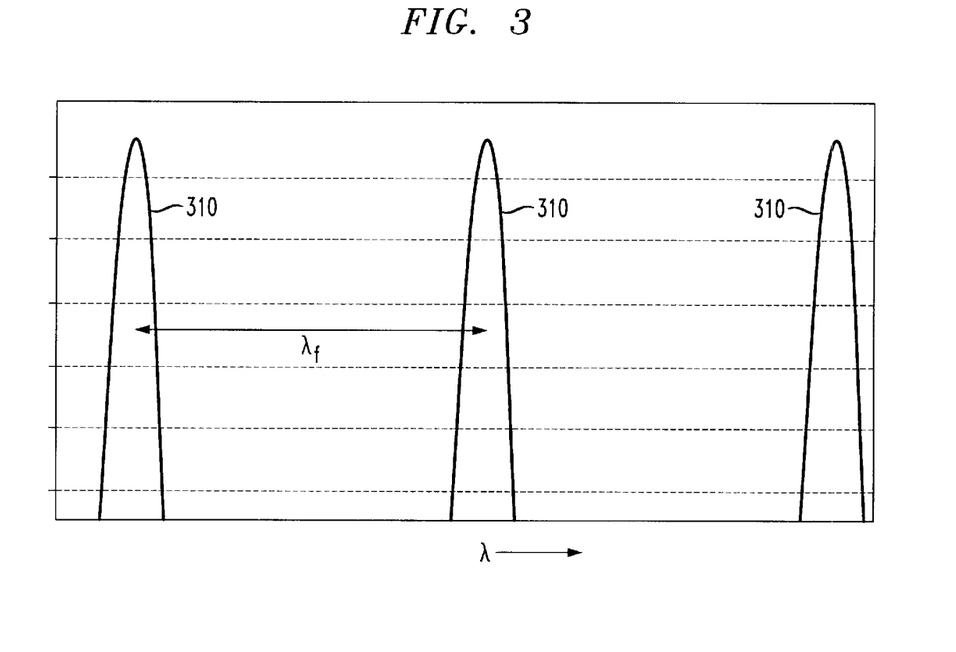
FIGS. 3 and 4 illustrate output characteristics of the basic wavelength outer of FIG. 1.

In a conventional router, all the output ports or waveguides are located inside the central zone (which in FIG. 2 represents the field of view $A_1 A_2$ of the router) and receive only the images produced in the central zone. In FIG. 1, only one output waveguide 180 is shown, and the input signal is efficiently transmitted to this waveguide at those wavelengths for which the central image location coincides with the particular waveguide location. As pointed out earlier, the central image location is a periodic function of the signal wavelength. In each period, the image varies over the entire central zone $A_1A_2$. As a result, the transmission coefficient has the periodic behavior shown in FIG. 3, consisting of equally spaced lobes 310. Each lobe corresponds to a wavelength for which the image $P_i$ coincides with the output waveguide location. The period, given by the spacing $\lambda_f$ between lobes, is called the free-spectral range. In a conventional router images produced outside the central zone (e.g., $P_{i-1}$, and $P_{i+1}$, of FIG. 2) are considered useless and so undesirable. Therefore, minimizing their intensities generally optimizes the router. To this purpose, one needs to optimize the radiation characteristics of the arms 150, since these radiation characteristics affect the intensities of the various images. Typically, the radiating apertures of the arms are arranged periodically ('a' in FIG. 2), thus forming a periodic array, and each aperture then produces the same radiation pattern, which is called the element pattern of the array. Maximum efficiency in the central zone is obtained by designing the array in known fashion, so that the element pattern ideally approximates a rectangular function, $$P(x) = rect\left(\frac{x}{\Omega}\right)$$

characterized by essentially unity amplitude inside the central zone and essentially zero amplitude outside. Each arm in this case radiates its entire power inside the central zone, and unwanted images outside this item zone are effectively eliminated. In practice, such a rectangular function is difficult to realize, and a simpler design is typically used, producing the power pattern $$P(x) = \frac{\pi^2}{2}\left[\frac{\cos(\pi x/\Omega)}{(\pi/2)^2(\pi x/\Omega)^2}\right]^2$$

Figure 4:
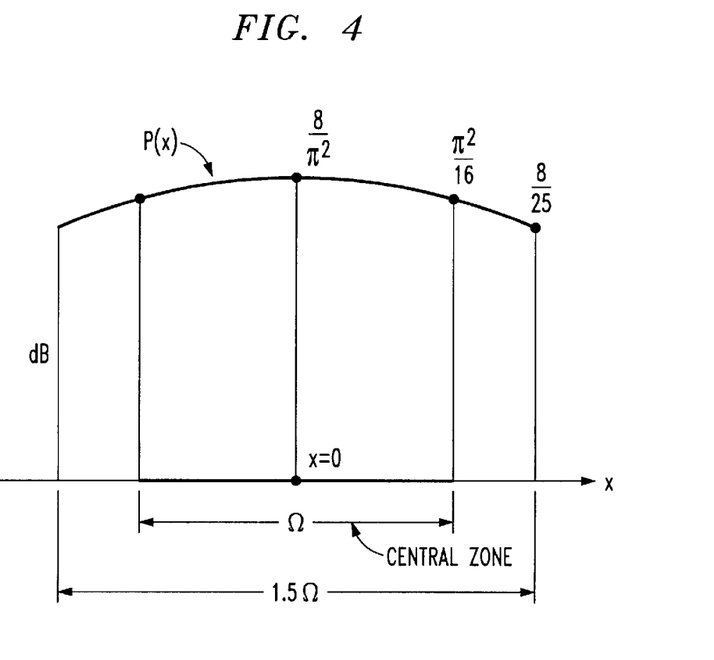

As shown in FIG. 4, this power pattern varies appreciably in the central zone and, outside this zone, it produces appreciable values in the vicinity of the boundaries of the central zone.

However, the above variation is highly undesirable for our purpose here. I therefore next construct a reflective arrangement that substantially eliminates this problem, by equally reflecting all significant images. This will essentially eliminate the above variation and, as a result, rectangular passbands will be realized to a good approximation.

B. Description of Invention

My interleaver, in its most general form, is essentially a periodic device with period equal to an integer fraction of the grating free-spectral range $\lambda_f$. Specifically, the purpose of the interleaver is to separate an input signal consisting of equally spaced wavelength channels with center wavelengths $\lambda_1, \lambda_2, \lambda_3, \lambda_4, \lambda_5, \lambda_6, \ldots$ (where $\lambda_1 < \lambda_2 < \lambda_3 \ldots$), into two sets of signals, consisting of the odd and even channels, with center wavelengths $\lambda_1, \lambda_3, \lambda_5, \ldots$ and $\lambda_2, \lambda_4, \lambda_6, \ldots$ characterized by twice the wavelength spacing of the original input signal. To this purpose, each transmission coefficient of the interleaver must be essentially characterized by periodic behavior, with equally spaced passbands separated by stopbands, and with maximally flat behavior in each passband and stopband. As stated earlier, the period is in general an integer fraction of the free-spectral range, but it is convenient to first consider the special case where the integer is one, since the general case is entirely analogous. Then, the wavelength spacing, for each of the above two sets of wavelengths, is equal to the free-spectral range $\lambda_f$.

Figure 5A:
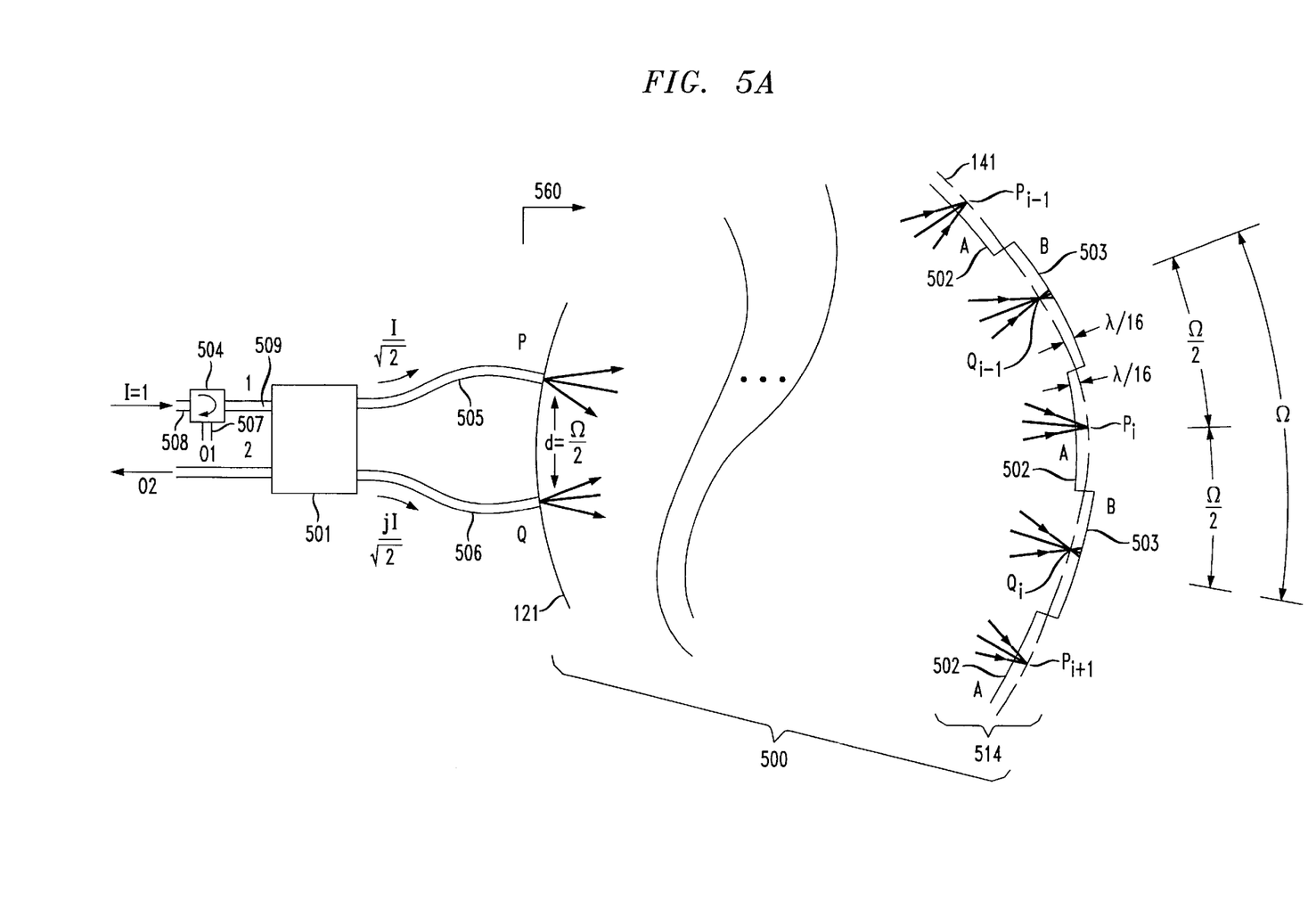
FIG. 5A shows a first embodiment of my invention as a wavelength slicer.

In accordance with the present invention, I have adapted the wavelength router described earlier to realize a low loss wavelength interleaver, or slicer, having rectangular wavelength transfer functions. With reference to FIG. 5A, illustratively, my interleaver includes a 2×2 coupler 501 together with a router 500. For convenience, only the input curve 121 and output image curve 141 of the router 500 are shown, the remainder of router 500 being implemented and operating the same as the router 100 shown in FIG. 1. Moreover I consider here the special case of an imaging arrangement characterized by unity magnification M between the input and output curve, but other magnifications may be advantageous in general. It is convenient to initially consider an input signal I applied with unit amplitude at a particular wavelength. The input signal I is inputted through circulator 504 to port 1 of the coupler 501. The input signal I is split by coupler 501 forming two signal components of amplitudes ($I/\sqrt{2}$) and ($jI/\sqrt{2}$) applied to the two waveguides connected to the input curve at two separate locations P and Q. The output curve 141 of the router 500 is adapted with a periodic arrangement of reflectors 502, 503 which cause each input signal component originating from P, Q to pass twice through the router 500. In FIG. 5A, the circulator 504 separates the output signal O1 from signal I, thus causing signal O1 to exit at a separate port 507. Output signal O2 exits port 2 of the coupler 501. As will be discussed below, if the input signal I includes an equally spaced multiple-wavelength signal $\lambda 1, \lambda 2, \lambda 3, \lambda 4$ of suitable spacing, output signal O1 includes all even wavelengths $\lambda 2, \lambda 4$ of the input signal I and output signal O2 includes all odd wavelengths $\lambda 1, \lambda 3$ of the input signal I. Note that the phrases even wavelength and odd wavelength refers to a wavelength's (or wavelength channel's) position in the sequence $\lambda 1, \lambda 2, \lambda 3, \lambda 4$ rather than the frequency of that wavelength.

Figure 5B:
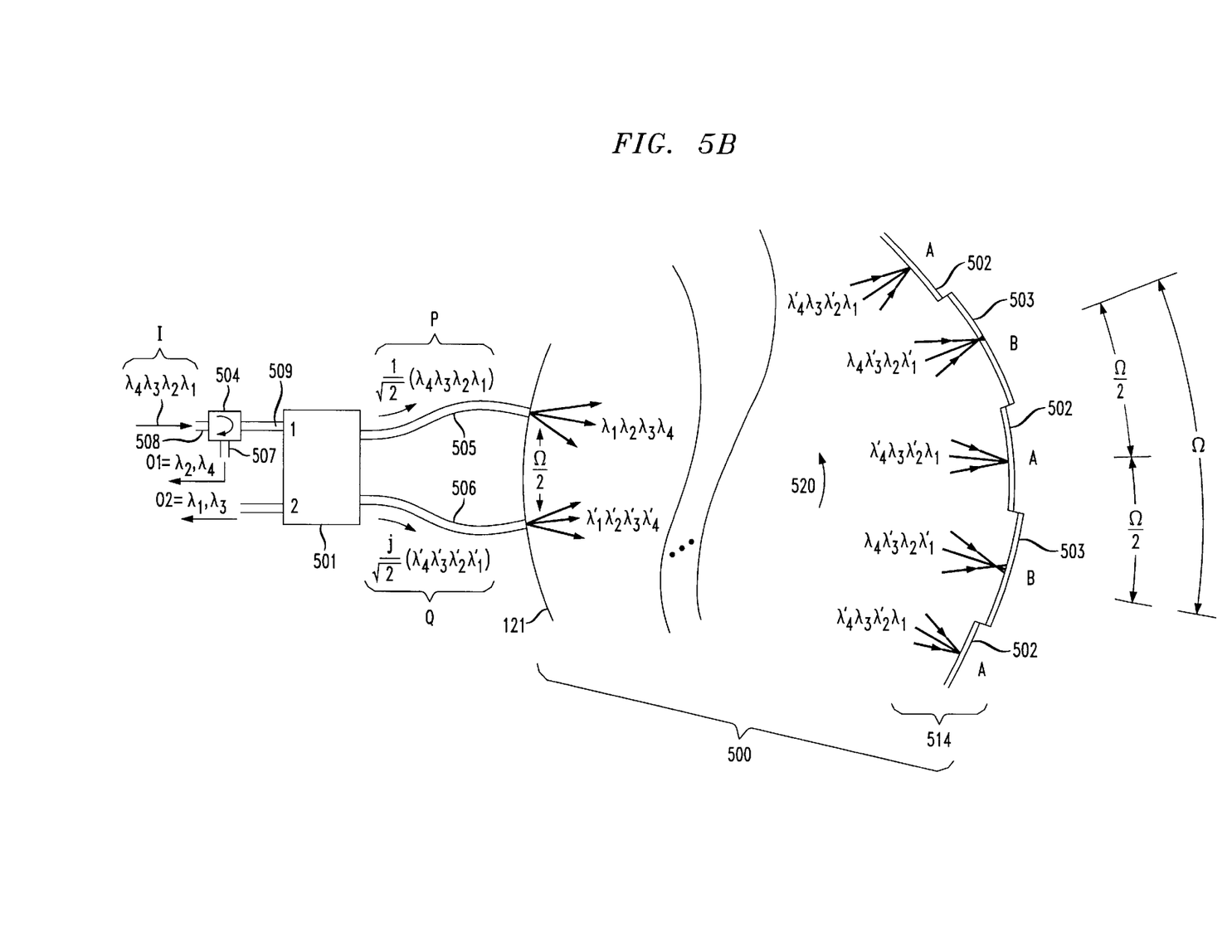
FIG. 5B shows the path of the individual center wavelengths of a multiple wavelength input signal as they twice traverse the wavelength slicer of FIG. 5A.

As shown, the output curve 141 of router 500 includes two interleaved sets A and B of equally spaced reflectors 501, 502. In this example the two input locations P,Q are separated by $d \cong \Omega/2$ where $\Omega$ is the separation of the various images $P_{i+1}, P_i, P_{i-1}$ and $Q_i, Q_{i-1}$. The two sets A, B are also separated by $\Omega/2$. Notice each set is slightly displaced from the output curve 141, and their displacements are properly chosen so as to effectively produce a phase shift of $\pi/2$ between the reflected interleaved signals from $P_{i+1}, P_i, P_{i-1}$ and $Q_i, Q_{i-1}$, which in FIG. 5A are shown reflected by reflectors A and B, respectively. Notice, if the signal wavelength in FIG. 5B is changed by $\lambda_f/2$, so as to cause the images $P_{i+1}, P_i, P_{i-1}$ and $Q_i, Q_{i-1}$, to be reflected, respectively, by reflectors B and A, the above phase shift will change sign, thus causing a net change of $\pi$. This change of $\pi$, will be produced next between two sets of even and odd wavelengths separated by $\lambda f/2$, and this is the basic mechanism that will allow the two sets of wavelengths to be separated by the 2×2 coupler. Notice the above phase shifts of $\pi$ and $\pi/2$ can in general differ from the specified values, provided the difference is small enough, so that the design tolerance for crosstalk and efficiency of the optical apparatus is not exceeded.

With reference to FIG. 5B, using the illustrative input signal $\lambda 1$–$\lambda 4$ the formation of the output signals O1 and O2 is described. I now let the input signal consist of equally spaced ($\lambda 1, \lambda 2, \lambda 3, \lambda 4$) with spacing equal to $\lambda_f/2$, where $\lambda_f$ the free-spectral range. The splitter 501 then produces at the locations P and Q the components ($I/\sqrt{2}$) ($\lambda 1, \lambda 2, \lambda 3, \lambda 4$) and ($jI/\sqrt{2}$) ($\lambda 1, \lambda 2, \lambda 3, \lambda 4$), respectively. Note that the two components have the same amplitude but differ in phase by 90 degrees. For the following discussion, I ignore the ($I/\sqrt{2}$) and ($jI/\sqrt{2}$) scaling and phase factors. Furthermore, to distinguish the two sets of signals originating from P and Q, those originating from Q are denoted with a "prime"

character, i.e., $\lambda 1', \lambda 2', \lambda 3', \lambda 4'$. Notice that the wavelength spacing $\lambda_f/2$ is transformed by the router dispersion coefficient into a displacement 520 of magnitude $\Omega/2$. Thus as shown, the odd P wavelengths $\lambda 1$ and $\lambda 3$ along with the even Q wavelengths $\lambda 2'$, $\lambda 4'$ all impinge the segments A, while the even P wavelengths $\lambda 2$ and $\lambda 4$ along with the odd Q wavelengths $\lambda 1'$, $\lambda 3'$ all impinge the segments B. These signals are reflected by the A and B segments back to their P and Q sources, where waveguides 505 and 506 connect to the input curve 121. Note that the two sets A, B are slightly displaced from the image curve. Their displacements are properly chosen so as to effectively cause a relative phase shift of $\pi/2$ between the signals reflected by the two sets. These P and Q signal components are respectively reflected back to their initial locations P and Q. The 2×2 coupler 501, which is bi-directional, then acts on the reflected signals as a signal combiner 501. Because of the different phase shifts applied by the reflectors to the even and odd components, the 2×2 signal combiner 501 outputs the even wavelengths $\lambda 2$ and $\lambda 4$ at port 1 (and then port 507 via circulator 504) and outputs odd wavelengths $\lambda 1$ and $\lambda 3$ at port 2.

Figure 5C:
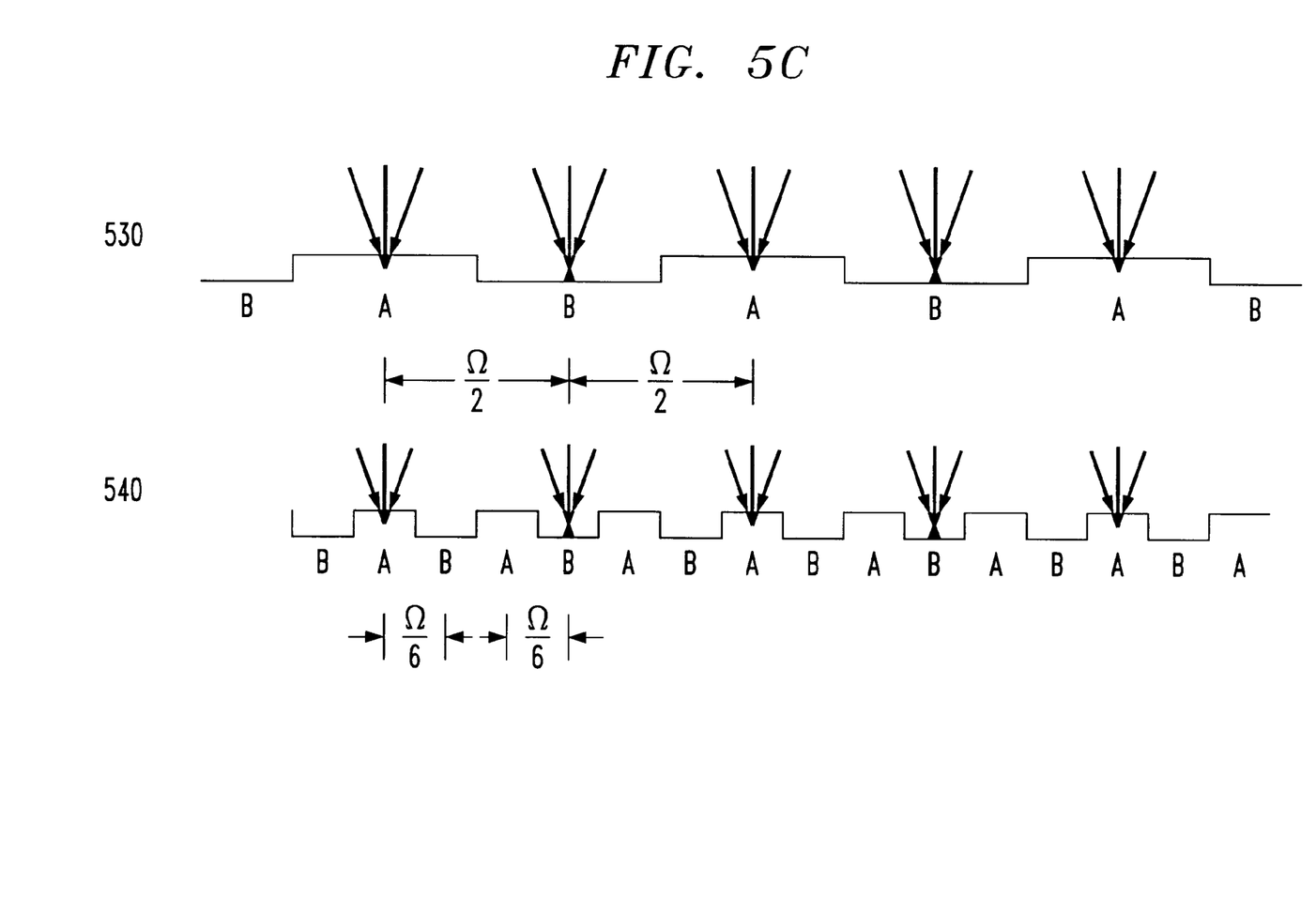
FIG. 5C shows illustrative arrangements for the segmented reflector used in the wavelength slicer of FIG. 5A.

To more easily discuss another aspect of the present invention, there is shown in FIG. 5C the segmented reflectors 514 arranged in a linear manner. Shown by 530 is the reflector arrangement of FIG. 5A, where the reflective segment A and B all have width $\Omega/2$, resulting in the largest channel spacing $\lambda_f/2$ for a given $\lambda_f$. This arrangement has the advantage that with a reflector width of $\Omega/2$ it is particularly suitable to realize very wide passbands with maximum flatness because of the large width of the various reflective elements. On the other hand, it requires a grating with greater dispersion coefficient and, therefore, larger dimensions for a given channel spacing. Shown by 540 is another illustrative reflector arrangement, where the reflector width is one third that shown in arrangement 530. The arrangement 540 has the advantage that with a reflector width of $\Omega/2$ it allows a larger number of channels, and it reduces the grating dimensions for a given channel spacing. On the other hand it has disadvantages of smaller reflectors and, therefore, reduced passband flatness.

Figure 6A:
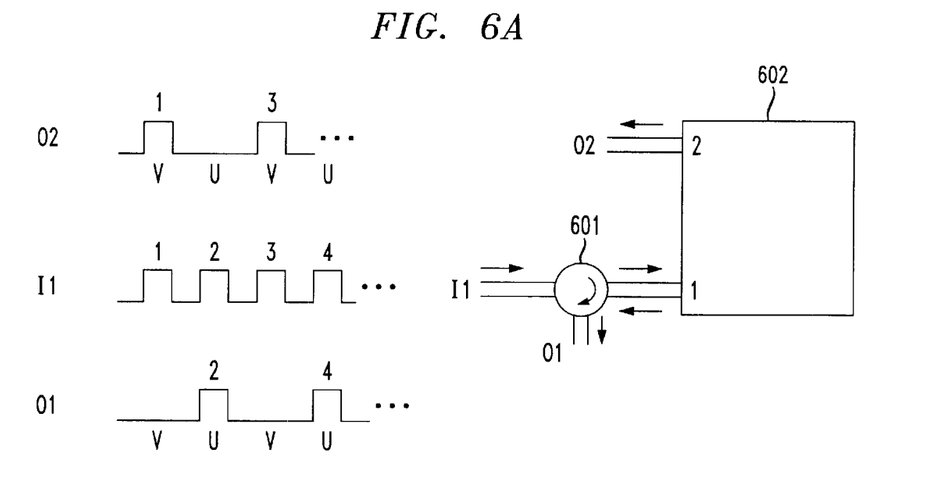
FIGS. 6A–6C show other applications of the wavelength slicer of FIG. 5.
Figure 6B:
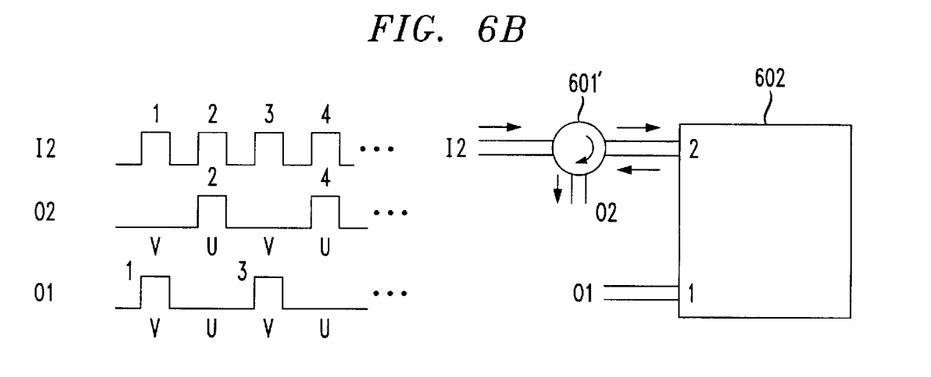
Figure 6C:
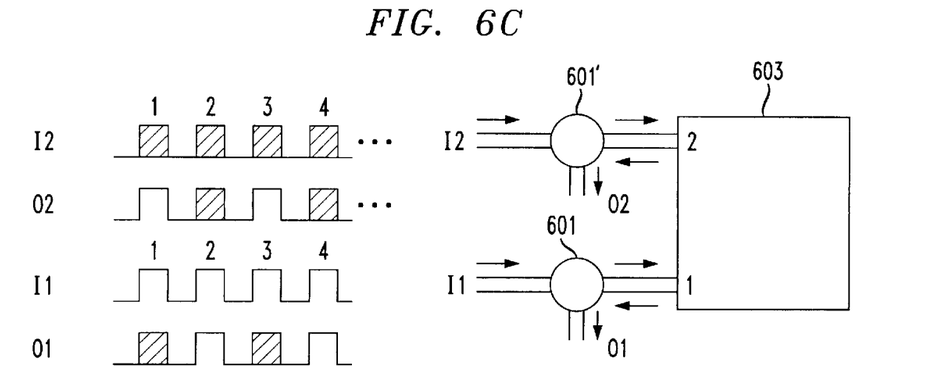

With reference to FIGS. 6A–6C, there is shown the input signals and output signals of the slicer of FIG. 5A when it is used as a 1×2 device (FIG. 6A), another slicer used as a 1×2 device (FIG. 6B), and a slicer used as 2×2 device (FIG. 6C). Shown in FIG. 6A is my slicer 602 used as a 1×2 device and including a circulator 601 to separate the input and output signals to and from port 1 of slicer 602. Note this slicer is said to be used as a 1×2 device because only one input is applied to it. As shown, in FIG. 6A, the odd wavelengths of the input signal are outputted at port 2 of the slicer 602 and the even wavelengths are outputted via circulator 601 from port 1 of the slicer 602. In FIG. 6B, the input I2 is applied via circulator 601' to port 2 of slicer 602. As shown, the even wavelengths of the input signal are outputted via circulator 601' from port 2 of the slicer 602 and the odd wavelengths are outputted from port 1 of the slicer 602. In FIG. 6C, there is shown two circulators 601 and 601' connected to ports 1 and 2 of a slicer 603 which is fully used as a 2×2 device. When input signal I1 is applied only to port 1 of slicer 603, I have the same result shown in FIG. 6A, i.e., the odd wavelengths of the input signal are outputted at output O2 (via circulator 601' and port 2 of slicer 603) and the even wavelengths are outputted at output O1 (via circulator 601 from port 1 of the slicer 603). When the input I2 is applied at port 2, the odd wavelengths are outputted at output O1 (via circulator 601 and port 1 of slicer 603) and the even wavelengths are outputted at output O2 (via circulator 601' and port 2 of the slicer 603).

My interleaver or slicer, in its simplest form, can be simply used as 1×2 splitter device whose wavelength behavior is characterized by periodic transmission coefficients. In this case, the purpose of the interleaver is simply to separate an input signal consisting of equally spaced wavelength channels with center wavelengths $\lambda_1, \lambda_2, \lambda_3, \lambda_4, \lambda_5, \lambda_6, \ldots$ into two signals, consisting of the odd and even channels $\lambda_1, \lambda_3, \lambda_5, \ldots$ and $\lambda_2, \lambda_4, \lambda_6, \ldots$ having twice the wavelength spacing of the original input signal. To this purpose, each transmission coefficient of the interleaver must be essentially characterized by periodic behavior, with equally spaced passbands separated by stopbands, and with maximally flat behavior in each passband and stopband. Moreover, the two transmission coefficients of the interleaver must have complementary behaviors. That is, the stopbands of either coefficient must correspond to the passbands of the other. More generally, my interleaver can be realized as a 2×2 device (as shown in FIG. 6C) in which case each wavelength transmission coefficient from either input port I1, I2 to the two output ports O1, O2 must have complementary behaviors. Note that the transmission characteristics of the 2×2 device is reversible or bidirectional, i.e., same behavior is obtained for the transmission coefficients from the two ports O1, O2 to either port I1, I2. Notice, by reversing transmission in a 1×2 interleaver (of FIG. 6A or 6B) one obtains a 2×1 interleaver, whose function is to combine two input signals, consisting of even and odd channels, into a single interleaved output signal. More generally, by combining the two functions 1×2 of FIGS. 6A and B one obtains the general case 2×2 of FIG. 6C).

C. Detailed Description

I have designed my interleaver by combining a 2×2 coupler with a wavelength router adapted with suitable reflective terminations. As previously discussed, FIG. 1 shows the basic structure of an imaging arrangement 100 of the form used in my invention. It includes input section 120 and output section 140 spaced apart and interconnected by a grating 150 including an appropriate plurality of optical waveguide arms 160. The input and output sections typically are each free space slabs, and they are characterized by curved boundaries. The arrangement is characterized by an input curve 121, two intermediate curves 122, 123 and an output curve 141. The arrangement transforms an input signal P, applied at a particular wavelength by an input waveguide 170, into a set of equally spaced output images $P_{i-1}$, $P_i$, and $P_{i+1}$ located on the output curve 141. Each output image $P_{i-1}$, $P_i$, and $P_{i+1}$, is a replica of the mode of the input waveguide, and the locations of the various images are approximately linear functions of the signal wavelength.

Figure 7:
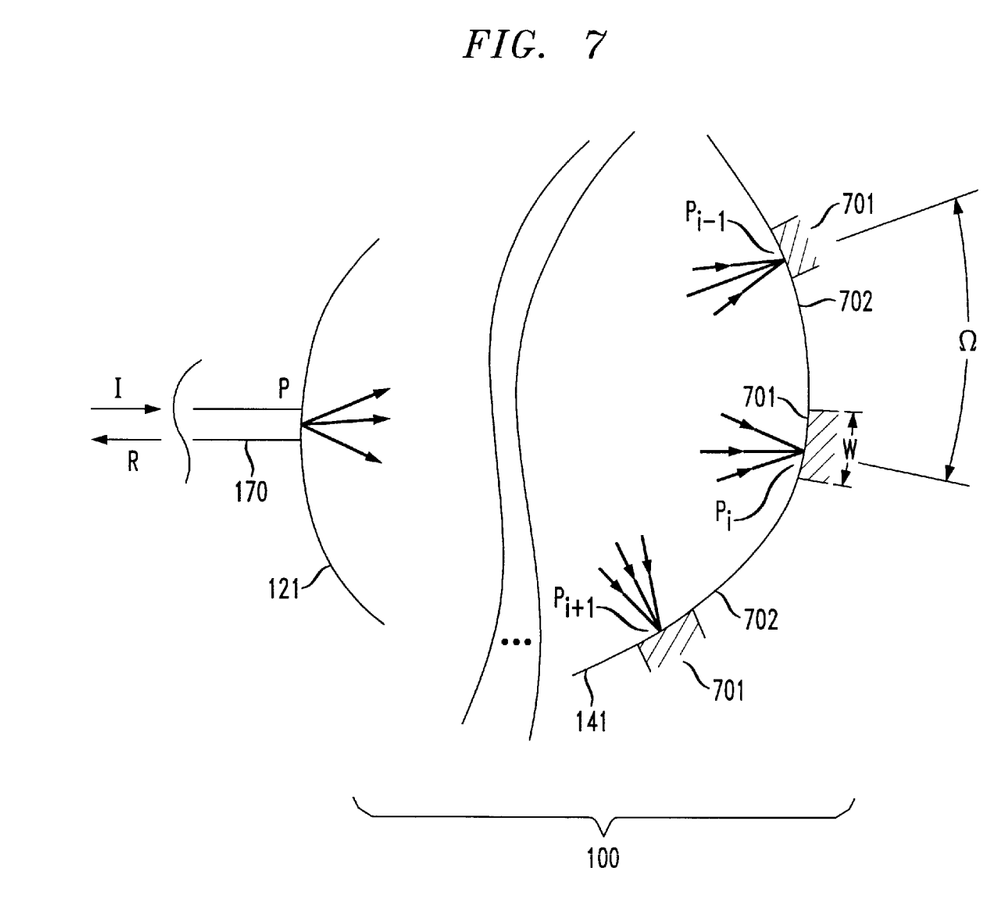
FIG. 7 shows an embodiment of my invention as a wavelength filter.

In a conventional router of FIG. 1, only one of the above images, the principal image of greatest intensity, is used. In FIG. 2, this is the image $P_i$ that is located inside the central interval $A_1A_2$ called the central zone. The other images $P_{i-1}$, and $P_{i+1}$, located outside this interval are considered useless and so undesirable, for they cause appreciable loss. In accordance with the present invention, all-important images $P_{i-1}$, $P_i$, $P_{i+1}$, (with significant energy) are used, which will substantially reduce the total loss. To show this I first describe the design of a low loss filter with rectangular transfer function. As shown in FIG. 7, the filter is realized by forming on the output image curve 141 a set of equally spaced reflectors 701 with spacing equal to the spacing $\Omega$ of the images. The input signal is applied to input waveguide 170, connected at P to the input curve 121, so as to produce efficiently a set of equally spaced output images $P_{i-1}$, $P_i$, $P_{i+1}$. There will then be a set of equally spaced wavelength intervals for which the images will be produced inside the width W of the reflectors. At these wavelengths, all images will be reflected back towards the grating 100, and the reflected power will be transferred efficiently back to the input waveguide 170, thereby causing a reflected signal R. The reflected signal R can be separated from the input signal by using a circulator (e.g., see 601 of FIG. 6A), and the corresponding transmission coefficient will be characterized by equally spaced passbands (reflected by reflector segments 701), separated by stopbands 703, and the passbands will be maximally flat. The loss can be made very low, about one dB, neglecting material losses. This design has thus produced a set of flat passbands, realized by passing through the same grating 100 twice. Notice that all reflectors FIG. 7 are equally spaced by $\Omega$ and have the same width, and therefore equally spaced passbands of the same width are produced. However this is not the most general case. In particular the reflectors can be spaced ;by an integer fraction of $\Omega$, and they need not have the same width. The important requirement that the reflector arrangement must satisfy is that it must be essentially periodic with period $\Omega$, since the arrangement must equally reflect all relevant images produced (with spacing $\Omega$) by each input wavelength within each passband.

Figure 8A:
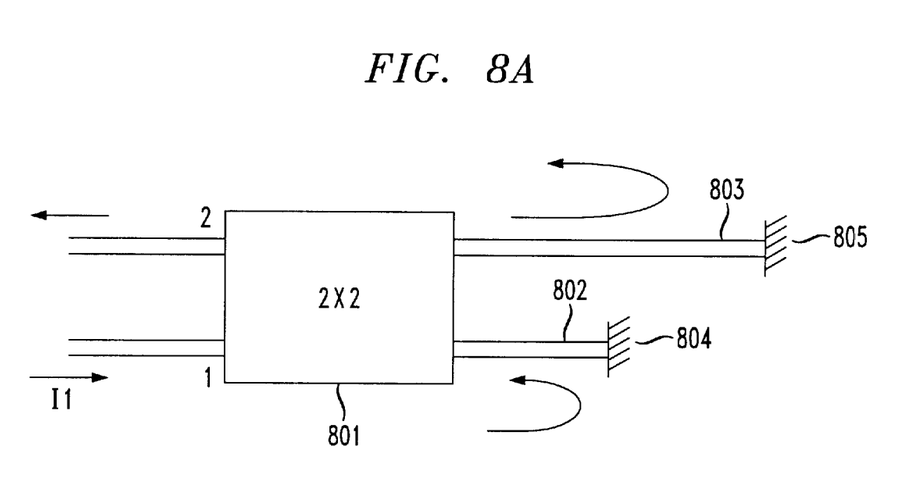
FIG. 8A shows how to eliminate the use of a circulator by combining an input 2×2 coupler with the imaging arrangement.

The need for a circulator in FIG. 7 can be eliminated as follows by combining an input 2×2 coupler with the above imaging arrangement. The basic concept is illustrated in FIG. 8A, where an input 2×2 coupler is connected to two output waveguides of different lengths 802, 803, terminated by two reflectors 804, 805, respectively. An input signal I1 applied to one of the two input ports 1, 2 is split by the 2×2 device 801 into two output components which are totally reflected, and which, depending on the path length difference of the two output waveguides 802, 803, can be made to exit at either of the two input ports 1, 2. Thus, I have determined that by properly choosing this path length difference, I can cause the input signal at input port 1 to be reflected back to the unused port 2 (or vice versa). In order to realize this behavior, the 2×2 coupler must satisfy two conditions. One condition is that the above two components, produced by a signal applied to one of the two input ports, must essentially have equal magnitude. The second condition is obtained by simultaneously applying an input signal to each input ports. Then, the two signals must produce two orthogonal sets of output components. A third condition that was assumed here for simplicity, but it is not actually needed, is that either set is characterized by a phase shift of $\pi/2$ between the two components. An alternative arrangement which does not require a separate 2×2 coupler is obtained by incorporating the 2×2 coupler in the imaging arrangement. Then a suitable path length variation must be introduced in the arms of the waveguide grating of FIG. 1 as shown by U. S. Pat. No. 6,023,544, issued on Feb. 8, 2000. In the next discussion, however, the 2×2 coupler is assumed to be connected to the input curve 121 of the imaging arrangement of FIG. 7, as shown in FIG. 5A. I next use the above technique to construct a wavelength slicer.

As discussed previously, the purpose of a slicer is to separate an input signal consisting of wavelength channels $\lambda_1, \lambda_2, \lambda_3, \lambda_4, \ldots$ into two signals, consisting of the even and odd channels $\lambda_1, \lambda_3, \ldots$ and $\lambda_2, \lambda_4, \ldots$. In the arrangement of FIG. 5A, the purpose of the waveguide grating 500 is to separate the various channels. At each wavelength $\lambda$, this arrangement transforms an input point source P formed by an input waveguide 505 into several output images $P_{i-1}$, $P_i$, $P_{i+1}$ corresponding to the various orders of the grating. The locations $P_{i-1}$, $P_i$, $P_{1+1}$ of these images vary with wavelength, and their spacing is $$\Omega \approx R\lambda/a$$

where a is the period of the grating.

Figure 8B:
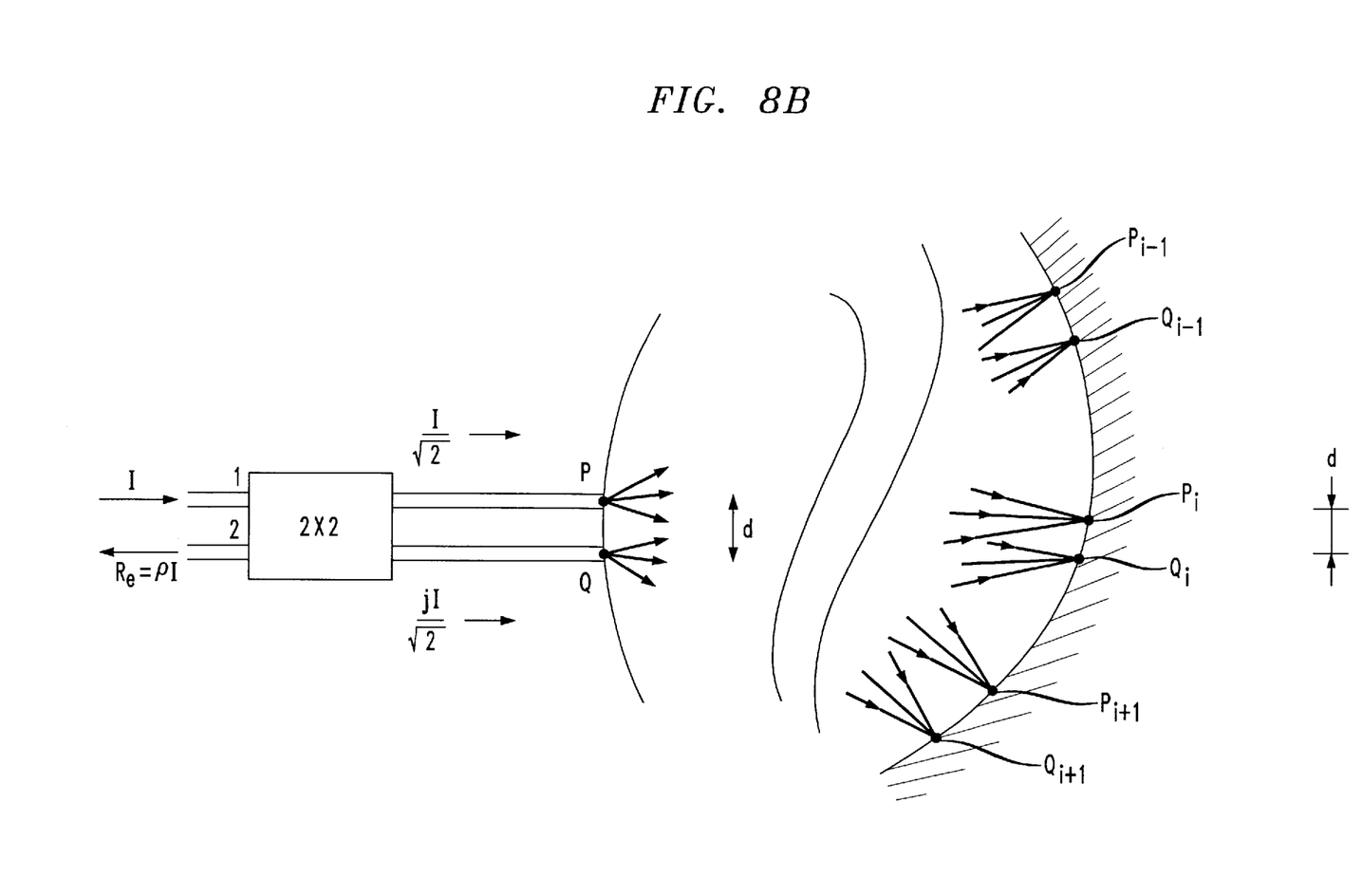
FIG. 8B shows the technique of FIG. 8A applied to the filter of FIG. 7.

The basic properties of the arrangements considered here are best understood by first considering a special case, the design of a reflective filter realized as shown in FIG. 7. The filter simply consists of an imaging arrangement with a set of reflectors located along the output image curve. Initially let the segmented reflector be replaced by a single reflector covering the entire image curve. Then all images are reflected back towards the grating, and the grating then recombines the various images into a single reflected image produced at the input waveguide location P. Then, a reflection coefficient close to unity will be produced in the input waveguide, and the reflection will be approximately wavelength independent. The above result clearly applies in general to any input signal including several wavelengths, and a similar result is obtained in FIG. 7 by using a set of reflectors, except that now the reflected image produced at P only includes those wavelengths that are reflected by the reflectors. Effectively, I have terminated the input waveguide with a reflective termination that only reflects certain wavelengths. Thus consider the wavelength response, obtained by applying to the arrangement an input signal of unit power and variable wavelength. Then neglecting material losses, the wavelength response given by the input reflection coefficient $\rho$ essentially exhibits a periodic set of passbands of unit amplitude separated by stopbands, and each passband is produced by a particular subset of the reflecting elements, namely a subset with elements separated by the spacing $\Omega$ of the various orders. An undesirable feature of this filter, however, is that the output signal is reflected back to the same input waveguide from which the input signal originated. In order to transfer the signal to a different waveguide, the arrangement has to be modified by including a 2×2 coupler as suggested by FIG. 8A. The resulting arrangement is shown in FIG. 8B. The input waveguide is now replaced by a 2×2 coupler that splits the input signal into two components, thus producing two separate point sources P, Q separated by d with amplitudes $I/\sqrt{2}$, $jI/\sqrt{2}$. Notice the input signal is applied to port 1 of the 2×2 arrangement. The arrangement now produces two sets of interleaved images $P_i$, $Q_i$. A single reflector covering the entire image curve again produces an input reflection coefficient $\rho$, but the incident I and reflected signals Re now occur at different input ports of the 2×2 coupler as shown in FIG. 8B. Notice $\rho$ is now a sum of two components $\rho_P$, $\rho_Q$ produced respectively by the two paths through P, Q. In order to produce the above behavior the two components $\rho_P$, $\rho_Q$ must add in phase at port 2 of the 2×2 coupler. Therefore the lengths of the two waveguides connecting the 2×2 coupler to P,Q must be properly chosen, so as to produce the appropriate phase shift, causing the two components to add in phase at the appropriate port. I next realize a wavelength interleaver by using a similar technique. Now a segmented reflector producing a variable phase shift replaces the reflector, since the interleaver must transfer the two sets of even and odd wavelengths to different ports. The phase shifts in the two cases (even and odd wavelengths) must differ by $\pi$, since they must cause the two components $\rho_P$, $\rho_Q$ to add in phase at different ports. This can be seen from FIG. 8A. In fact, in order for the reflection in FIG. 8B to appear at port 1, instead of 2, a phase shift of $\pi$ must be introduced in either one of the two waveguides 803 and 802. Equivalently, phase shifts $\pi/2$ and $-\pi/2$ must be produced in the two arms, respectively.

Consider the arrangement of FIG. 5B, whose purpose is to separate $\lambda_1, \lambda_2, \lambda_3, \lambda_4, \ldots$ into two sets, consisting of the odd $\lambda_1, \lambda_3, \ldots$ and even $\lambda_2, \lambda_4, \ldots$ channels, and let the wavelengths of either set be spaced by the free-spectral range $\lambda_f$ of the grating. The arrangement of FIG. 5B includes two interleaved sets A,B of reflective elements, and each set is slightly displaced by $\pm\lambda/16$ (as shown in FIG. 5A) from the image curve, so as to effectively produce a phase shift of $\pi/2$ between the signals reflected by the two sets A,B. A phase shift of $\pi/2$ is also included in one of the two output waveguides connected to the 2×2 coupler, so as to cause the above reflection p to appear at port 2 at a particular odd wavelength channel. Then, at this wavelength, the above phase shifts must be properly chosen so as to cause the two components $\rho_P, \rho_Q$ to appear in phase at port 2. Once this condition is satisfied, all odd wavelength channels will be transferred to port 2, since the arrangement is essentially periodic, with period equal to the free-spectral range. Next consider the even wavelength channels. For these wavelength channels, dispersion by the grating causes the images to be displaced by $\Omega/2$ from the images obtained in the other case, for the odd channels. This displacement is essentially equal to the spacing between reflectors A and B, and therefore the phase shifts applied by these reflectors to the images $P_i$, $Q_i$ are now interchanged, as compared to those in the previous case. This interchange effectively causes a phase shift of $\pi$ between the two components $\rho_P, \rho_Q$, thus causing the two components to appear in phase at port 1.

Notice, in the particular example of FIG. 5B, all the even wavelength $\lambda_2, \lambda_4$, of the signal P are reflected by the reflector segments B while all the even wavelengths $\lambda_2', \lambda_4'$ of the signal Q are reflected by the reflector segments A. On the other hand, all the odd wavelengths $\lambda_1, \lambda_3$ of the signal P are reflected by the reflector segments A while all the even wavelengths $\lambda_1', \lambda_3'$ of the signal Q are reflected by the reflector segments B. Thus, the roles of the two reflectors A, B are interchanged in the two cases, and this produces the above phase shift of $\pi$, causing the signals in the two cases to be reflected from different ports. Also notice, if the input signal I is applied at port 2 the odd components are reflected at port 1 and, the even components, at port2.

So far for simplicity I assumed that the various images are produced with unity magnification, in which case the separation d of the two input waveguides is equal to the corresponding separation of their output images. Moreover, the two separations were chosen equal to $\Omega/2$, in which case the channel spacing for either set of output channels $\lambda_1, \lambda_3, \ldots$ and $\lambda_2, \lambda_4, \ldots$ becomes equal to the free-spectral range $\lambda_f$. More generally, the above channel separation can be chosen equal to an integer fraction of $\lambda_f$, in which case each pair of reflectors A, B must be spaced by an integer fraction of $\Omega/2$, and d becomes an integer fraction of $\Omega/(2M)$, where M is the magnification. Also notice that I have neglected so far the small wavelength dependence of $\Omega$. Thus in practice the above separations must be determined by using for $\Omega$ a particular value $\Omega_0$ corresponding to a particular design wavelength.

I have thus realized a slicer (also called interleaver) characterized by a set of equally spaced intervals such that the even numbered channels of the input signal I will be transferred as output O1 to port 1. The output O1 of even numbered channels are transferred to the same waveguide 509 carrying the input signal, and therefore a circulator 510 is needed to separate the reflected channels (output 01) at port 507 from the input channels I at port 508.

Figure 9:
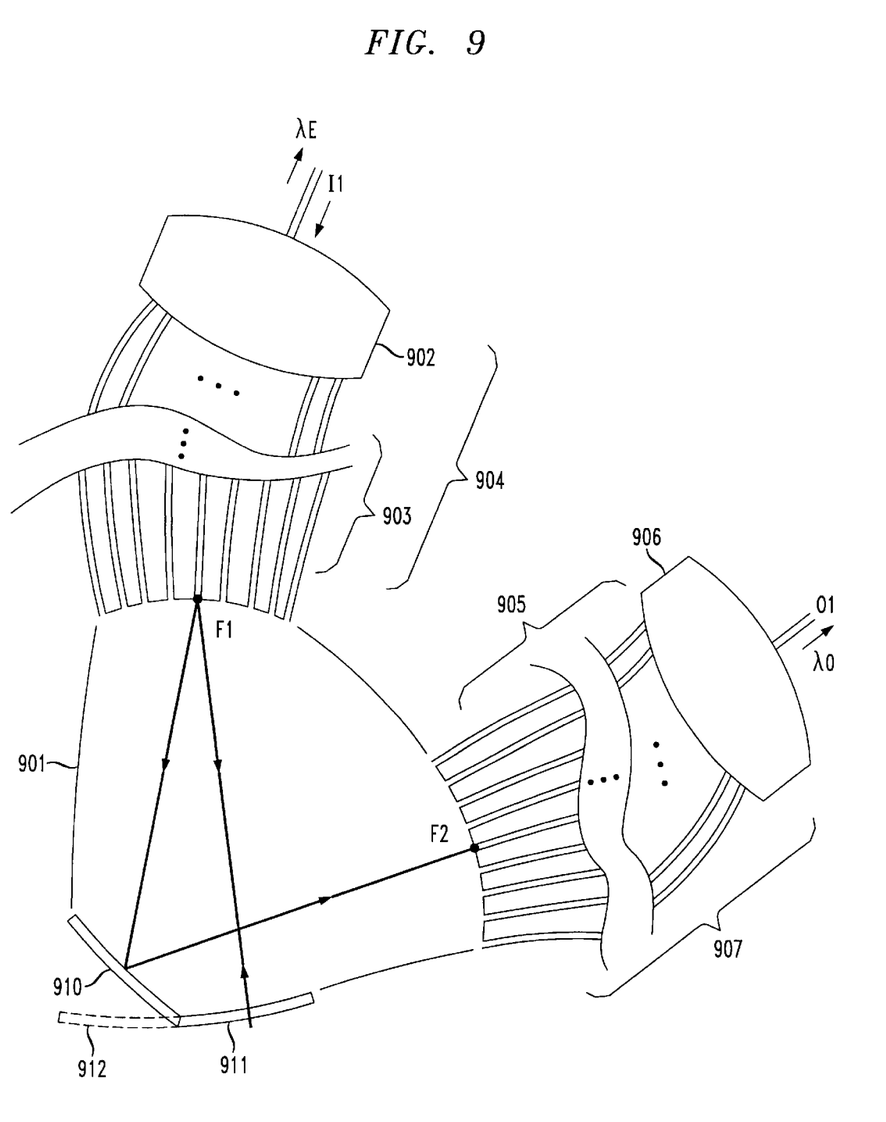
FIG. 9 shows another embodiment of my wavelength slicer.

With reference to FIG. 9 there is shown an alternate embodiment of my wavelength slicer which uses two separate routers 904 and 907 (which share a common free space slab 901) instead of two passes through the same router. As shown the first router 904 includes free space slab 902, grating 903 and common slab 901 while the second router 907 includes the common slab 901, grating 905, and slab 906. The input port I1 is used to receive the multiple wavelength input signal and to output the even wavelengths of the signal while output port 01 outputs the odd wavelengths of the signal. The arrangement of FIG. 9 uses two ordinary reflectors, an elliptical reflector 910 and a circular reflector 911. Note the elliptical reflector 910 has foci F1 and F2 and the circular reflector 911 is centered at F1.

The operation of the arrangement of FIG. 9 is as follows. All odd wavelengths of input signal at I1 are directed toward the section 912 of the circular reflector 911 but is intercepted by the elliptical reflector 910 which reflects the odd wavelengths $\lambda_O$ to the right side toward the second router 907 where it exits at port O1. All even wavelength $\lambda_E$ of input signal at I1 are directed toward the circular reflector 911 which reflects the even wavelengths back to the first router 904 where it exits at port I1 as an output signal $\lambda_E$. Again a circulator (not shown) can be connected to port I1 to separate the input 11 and output signal $\lambda_E$.

While the arrangement of FIG. 9 offers the advantage of only using a combination of two ordinary reflectors 910 and 911, the arrangement disadvantageously requires the use of two separate gratings 903 and 904 which increases the complexity of the arrangement.

As discussed earlier the 2×2 coupler 501 connected to the two input waveguides of the router in FIG. 5A can be eliminated by using the technique of U.S. Pat. No. 6,023,544, issued on Feb. 8, 2000. One must then introduce in the arms of the grating a suitable path length variation. The variation must be periodic, with period including two arms, and it must cause in each pair of adjacent arms opposite phase shifts of $\pm\pi/2$. The 2×2 coupler 501 can then be removed, and the resulting arrangement, comprising everything to the right of 560 in FIG. 5A, is found to be essentially equivalent to the original arrangement, with the 2×2 coupler instead of the above periodic variation. In fact, in the new arrangement, if an input signal is applied at a given wavelength to the waveguide located at P, one finds that the corresponding output images are split by the above path length variation into two separate sets, which are interleaved and displaced by $\Omega/2$. As a consequence the new arrangement is essentially equivalent to the original arrangement. That is, by applying to either port an input signal consisting of two interleaved sets of properly spaced wavelengths, the arrangement will separate the two sets and it will output them as reflected signals, respectively in the two input waveguides. Notice this technique, and the previous technique using a 2×2 coupler 501, differ in one important respect. By using the above path length variation instead of a 2×2 coupler, the spacing d of the two input waveguides must be chosen approximately equal to $\Omega/2$. Instead, by using a 2×2 coupler, the spacing d can be an integer fraction of $\Omega/2$, provided the two interleaved sets of reflectors A, B are also displaced by d. The above considerations assume unity magnification M for the output image curve. For arbitrary M simply change the spacing of P,Q to d/M, for a given $\Omega$ and given dimension of the reflector arrangement. A magnification M greater than one may be preferable to increase the size of each reflector element, thereby making it easier to fabricate. This will also enable the arrangement to have finer wavelength resolution or to handle more wavelength channels.

Notice the image curve is typically a circle of finite radius R. Clearly, however, the above results also apply to the special case where the image curve is a straight line, which can be viewed as circle of very large radius.

So far I have considered a planar imaging arrangement using a waveguide grating. More generally, an equivalent imaging arrangement can be realized using an Echelle grating, which is a well known type of grating characterized by a large path length difference between adjacent elements. The Echelle grating can be incorporated in a planar imaging arrangement, or in a conventional imaging arrangement (possibly including a lens or a curved reflector combined with an Echelle) realized in ordinary free-space.

What is claimed is:

1. An optical imaging apparatus comprising a grating having an input curve and an output image curve produced with specified magnification M, the optical imaging apparatus further comprising an input waveguide connected to a location P of the input curve for receiving an input signal at a particular input wavelength, the input signal being dispersed by the various orders of the grating into a set of equally spaced images produced on the output image curve with spacing $\Omega$, the dispersion by the grating causing the locations of the output images on the output image curve to vary with wavelength and a periodic arrangement A of reflective elements located along the output image curve with period essentially equal to an integer fraction of the spacing $\Omega$ of the output images, where the integer can be equal to unity, each reflective element essentially reversing the propagation direction of an image intercepted by that element, the periodic arrangement thereby causing the set of equally spaced images to produce reflected signals which pass back through the grating to the input waveguide, the reflected signals are efficiently transferred back to the input waveguide, thereby causing an output signal traveling in the input waveguide in a direction opposite that of the input signal.

2. The optical apparatus of claim 1 further comprising a circulator device connected between the input signal and the input waveguide so that its first port connects to the input signal, its second port connects to input waveguide, and its third port outputs a signal exiting the input waveguide.

3. The optical apparatus of claim 1 further comprising a second input waveguide connected to a location Q of the input curve, the two input waveguides forming two separate input ports with locations P and Q separated by a specified lateral displacement d, the periodic arrangement of reflective elements A is interleaved with a second periodic arrangement of reflective elements B, so that each element A is adjacent to element B, and the spacing of the two elements is approximately equal to the image Md of the input displacement d, the two elements A and B being characterized by reflections of similar magnitudes but different phases that approximately differ by $\pi/2$.

4. The optical apparatus of claim 3 further comprising a circulator device connected between the second input signal and the second input waveguide so that its first port connects to the second input signal, its second port connects to second input waveguide, and its third port outputs a signal exiting the second input waveguide.

5. The optical apparatus of claim 3 further comprising a 2×2 coupler having two input ports and two output ports, each output port connected to a different one of the first and second input waveguides, the optical apparatus thereby forming a reflective arrangement which is characterized by four reflection coefficients, each reflection coefficient being produced at a particular input port of the 2×2 coupler by an input signal applied to one of the two input ports, the reflective arrangement, in response to a multiple wavelength input signal applied to the first input port, producing a reflected signal back to the first input port which has a wavelength response characterized by two sets of interleaved wavelengths U and V, with one set U representing passbands of efficient reflection back to the first input port, and the other set V representing stopbands of substantially lower reflection back to the first input port.

6. The optical apparatus of claim 5 further comprising a circulator device connected between the input signal and the 2×2 coupler so that its first port connects to the input signal, its second port connects to a first input port of the 2×2 coupler, and its third port outputs a signal exiting the first input port of the 2×2 coupler.

7. The optical apparatus of claim 5 wherein the reflective arrangement produces a reflected signal back to the second input port which has a wavelength response characterized by two sets of interleaved wavelengths U and V, with the V set representing passbands of efficient reflection back to the second input port, and the U set representing stopbands of substantially lower reflection back to the second input port.

8. The optical apparatus of claim 5 wherein the reflective arrangement, in response to a first multiple wavelength input signal applied to the first input port and a second multiple wavelength input signal applied to the second input port, produces reflected signals back to the first input port with wavelength responses characterized by two sets of interleaved wavelengths U and V, with one set U representing passbands of efficient reflection from the multiple wavelength input signal applied to the first input port back to the first input port, and the other set V representing passbands of efficient reflection from the multiple wavelength input signal applied to the second input port back to the first input port.

9. The optical apparatus of claim 3 wherein the displacement d is chosen so that its image Md on the output curve is approximately equal to half the spacing $\Omega$ of the output images, and the grating is arranged to have a suitable periodic path length variation in adjacent arms so as to cause opposite phase shifts in adjacent arms, wherein a particular input signal of a particular wavelength is split into two interleaved output image sets displaced by $\Omega/2$, the optical apparatus thereby forming a reflective imaging arrangement with two input waveguides characterized by four reflection coefficients, each reflection coefficient produced in a particular input waveguide by a signal applied to one of the two input waveguides, such that the wavelength response produced by each of the four reflection coefficients is characterized by two sets of interleaved wavelength intervals, with one set representing passbands of efficient reflection, and the other set representing stopbands of substantially lower reflection.

10. The optical apparatus of claim 1 wherein the grating is a waveguide grating.

11. The optical apparatus of claim 1 wherein the grating is an Echelle grating.

12. An optical apparatus comprising
a first free space region having an input boundary, an output boundary, and a first input waveguide connected to the input boundary for receiving an input signal,
a second free space region having an input boundary and an output boundary,
a waveguide grating including a plurality of radiating arms each arm having a first end connected to the output boundary region of the first free space region and a second end connected to input boundary of the second free space region, and wherein
the second free space region includes a periodic segmented reflector formed on its output circular boundary region, the segmented reflector having period essentially equal to an integer fraction of the spacing of the various image orders, so that the various image orders of each wavelength interval of the input signal are equally reflected, each from its respective segment.

13. The optical apparatus of claim 12 being a periodic bandpass filter where the widths of the reflector segments are equal and determine the passbands of the filter and the sections between the reflector segments are non-reflective and determine the stopbands of the filter.

14. The optical apparatus of claim 12 wherein
the integer is 2 and alternate segments have different reflection characteristics.

15. The optical apparatus of claim 12 wherein adjacent segments produce a $\pi/2$ difference in phase shift.

16. The optical apparatus of claim 12 wherein
the segmented reflector includes an arrangement of two periodic interleaved sets of reflector segments, A and B, the two interleaved sets imparting a $\pi/2$ difference in phase shift to signals reflected therefrom,
the first free space region includes a second input waveguide connected to the input boundary for outputting a reflected signal, and
wherein the connections of the first and second waveguides to the input boundary, P and Q, are separated by a specified lateral displacement d, the spacing between adjacent segments A and B being approximately equal to the image Md of the input displacement d, the two segments A and B being characterized by reflections of similar magnitudes.

17. The optical apparatus of claim 16 wherein each segment has the same width.

18. The optical apparatus of claim 12 further comprising
a 2×2 coupler having two input ports and two output ports, each output port connected to a different one of the first and second input waveguides,
the optical apparatus thereby forming a reflective arrangement which is characterized by four reflection coefficients, each reflection coefficient is produced at a first input port of the 2×2 coupler by an input signal applied to that port or to a second input port of the 2×2 coupler, the reflective arrangement, in response to a multiple wavelength input signal applied to the first input port, producing a reflected signal back to the first input port which has a wavelength response characterized by two sets of interleaved wavelengths, with one set representing passbands of efficient reflection back to the first input port, and the other set representing stopbands of substantially lower reflection back to the first input port.

19. The optical apparatus of claim 18 wherein
when an input signal, including a sequence of wavelengths $\lambda_1, \lambda_2, \ldots \lambda_n$, where $\lambda_1 < \lambda_2 < \ldots < \lambda_n$, is applied to a first input port of the 2×2 coupler, each component signal outputted at each of the two output ports of the 2×2 coupler forms a plurality of images, where each image impinges a predetermined segment of the segmented reflector depending on the particular wavelength present in said each image,
wherein the adjacent segments of the segmented reflector introduce a $\pi/2$ difference in phase shift to the reflected image, and
wherein the even numbered wavelengths of said sequence of wavelengths said plurality of wavelengths are outputted at the first port of the 2×2 device and the odd numbered wavelengths of said the sequence of wavelengths are outputted at a second port of the 2×2 device.

20. The optical apparatus of claim 19 further comprising
a circulator device connected between the input signal and the 2×2 coupler so that its first port connects to the input signal and its second port connects to a first input port of the 2×2 coupler and its third port outputs a signal exiting the first input port of the 2×2 coupler.

21. The optical apparatus of claim 19 further comprising
a second circulator device :having a first port for receiving a second input signal including a plurality of wavelengths, a second port for coupling the second input signal into the second input port of the 2×2 coupler, and a third port for outputting a signal exiting the second input port of the 2×2 coupler.

22. The optical apparatus of claim 12, wherein the segments of the segmented reflector have a width $\Omega/2$ where $\Omega$ is the spacing between images orders and is approximately $$\Omega \approx R\lambda/a$$

and where R is the distance of a radiating arm from the arms focal point, $\lambda$ is the wavelength and a is the period of the grating.

23. A wavelength slicer comprising
a first router including a first free space region, a second free space region, a waveguide grating connected between said first and second free space regions,
and an input waveguide connected to the input side of the first free space region for inputting an input signal having multiple equally spaced wavelengths;
a second router including a first free space region, a second free space region, a waveguide grating connected between said first and second free space regions of the second router, an output waveguide connected to an input side of the first free space region of the second router, and wherein said second free space region of said second router overlaps said second free space region of said first router,
wherein the shared second free space region includes an elliptical reflector and a circular reflector, and wherein input signal images are radiated from the waveguide grating of the first router so as to impinge on the reflector arrangement, the circular reflector being located so as to reflect the odd numbered wavelengths of the radiated input signal images back through the waveguide grating of the first router to the input waveguide and the elliptical reflector being located so as to reflect the even numbered wavelengths of the input signal through the waveguide grating of the second router to the output waveguide.

* * * * *